Inventor
Fredrik Halvorsen
By H.L. & C.L.Reynolds
Attorneys

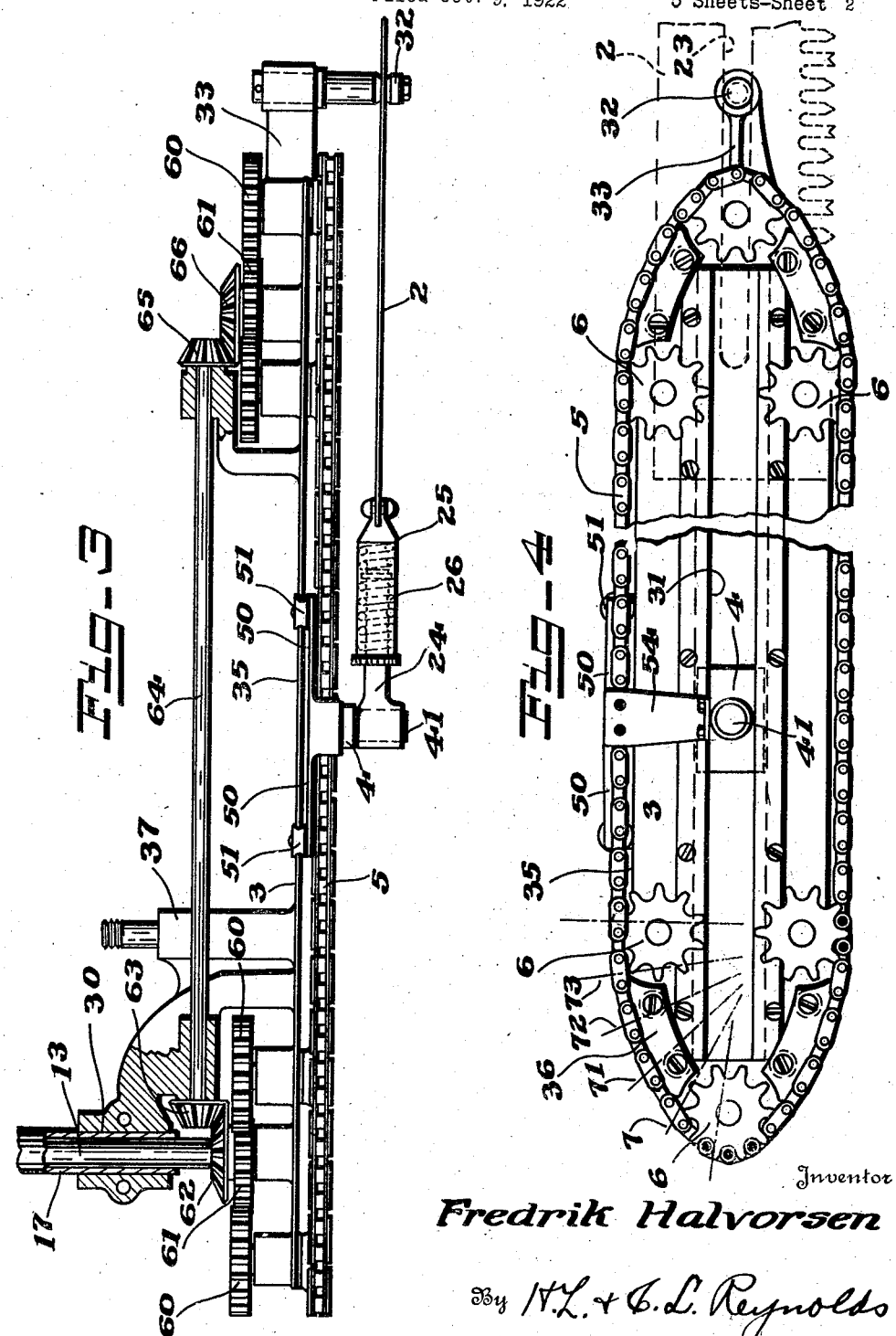

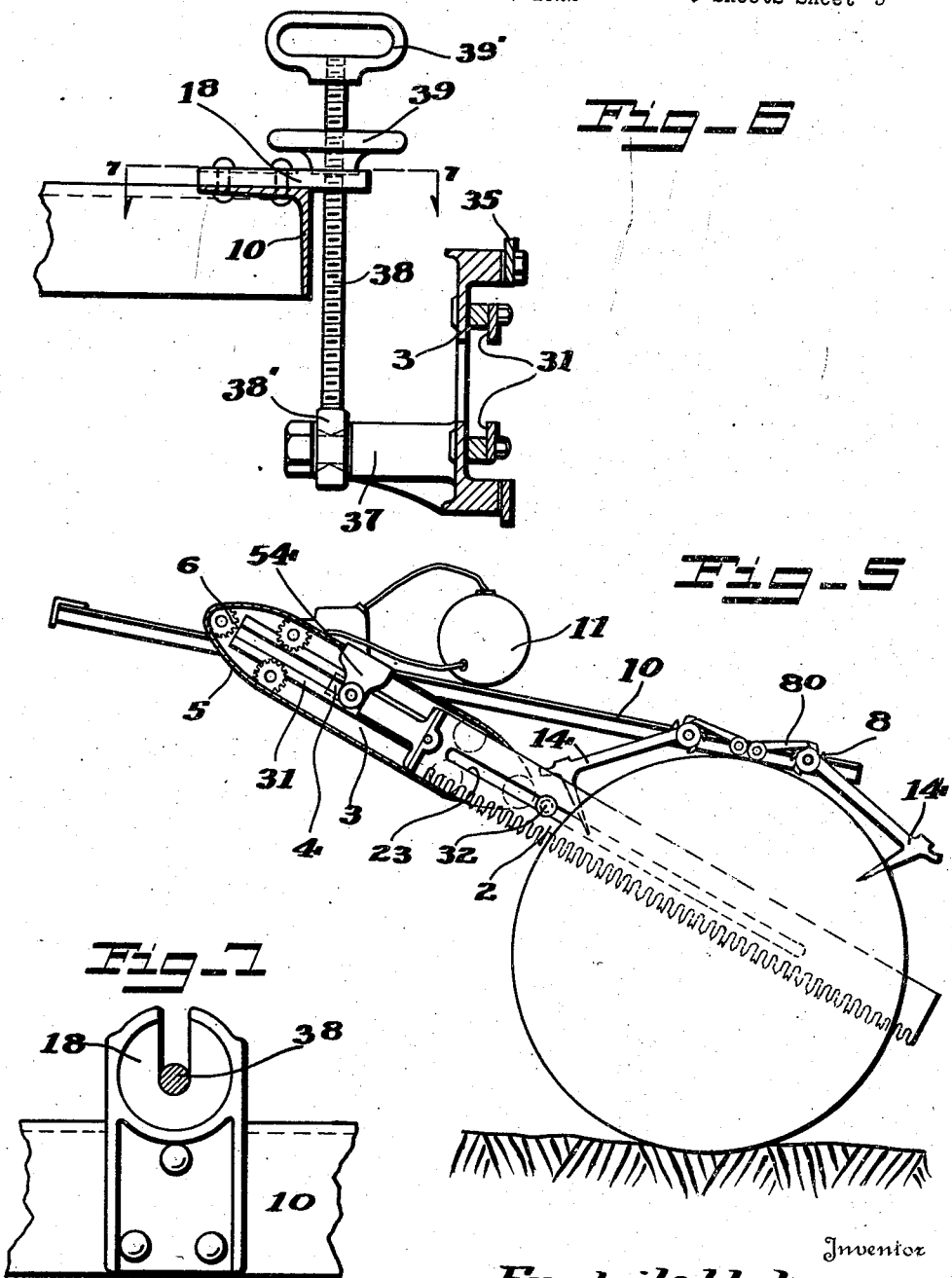

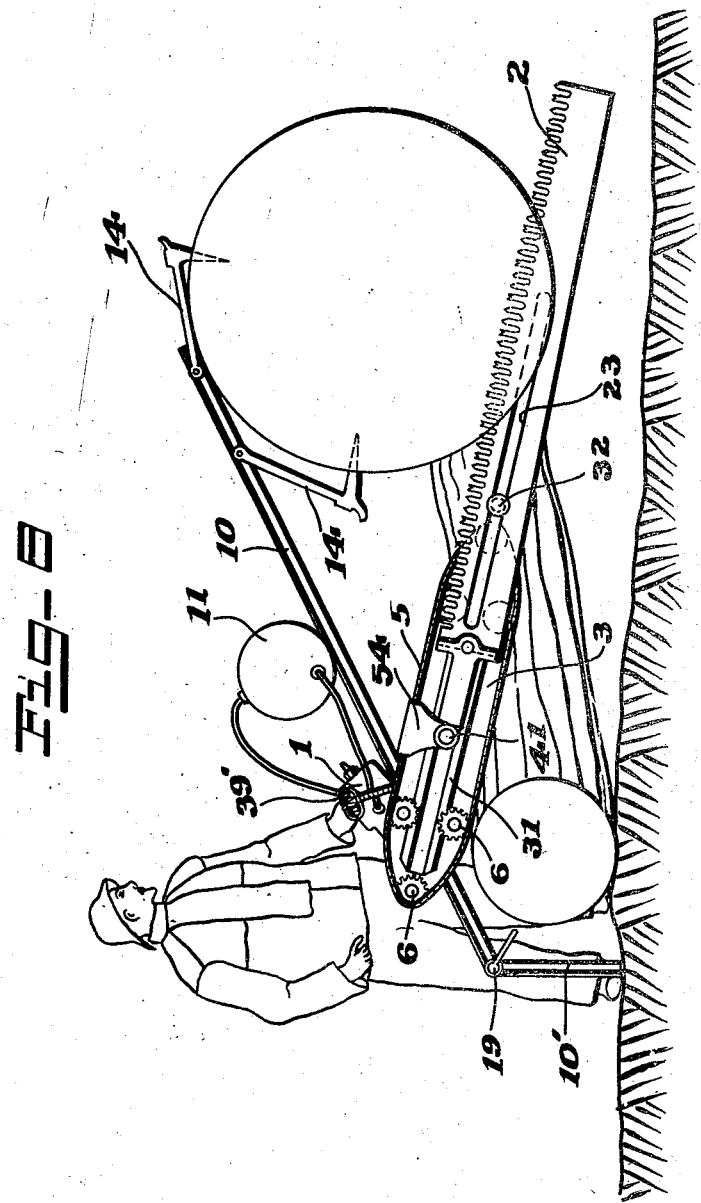

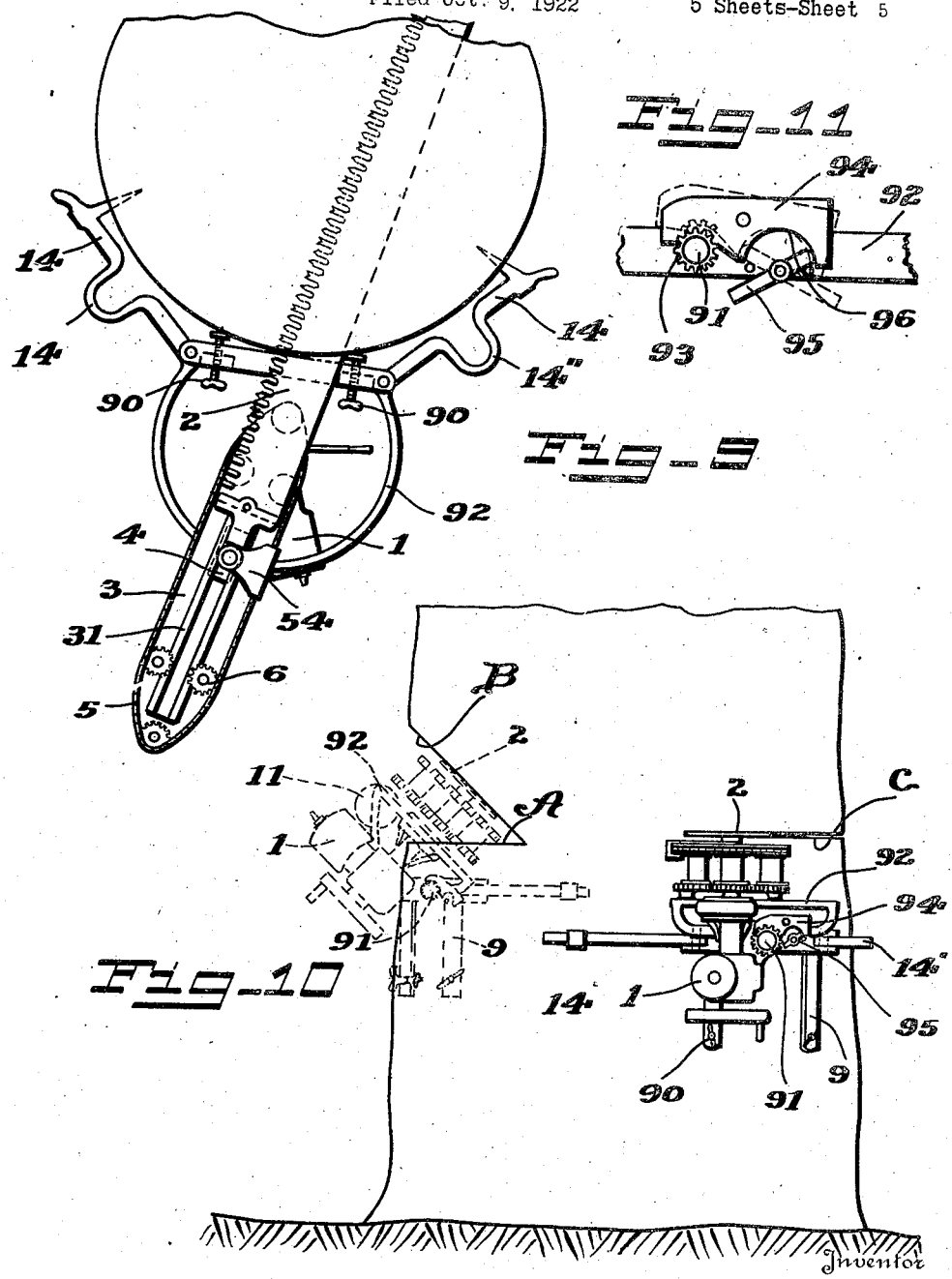

Patented Apr. 12, 1927.

1,624,662

UNITED STATES PATENT OFFICE.

FREDRIK HALVORSEN, OF SEATTLE, WASHINGTON.

POWER DRAG OR FALLING SAW.

Application filed October 9, 1922. Serial No. 593,253.

My invention relates to power driven saws and has for its general object the provision of a very light, portable saw of this character which can be transported through heavily wooded and mountainous areas, to be used either for falling trees or for "bucking", or cutting up, down timber into suitable lengths.

Aside from the general object, my principal object is to provide a simple, cheap and reliable, and light means for changing rotary motion of the motor into reciprocating motion of the saw.

A further object is to provide means whereby the stroke of the saw may be gradually increased in speed at the beginning of each stroke.

A further object is the provision of means and a mounting of the saw whereby the saw and its operating means exert the only pressure needed in bucking a log.

A further object is the provision of a novel supporting means for such a power driven saw which will enable it to be supported in various positions, partly from the ground and partly from the log to be sawn, or wholly from the log or tree to be sawn, whereby it may be used in positions otherwise difficult of access.

A further object is the provision of a supporting means whereby the saw may be used for sawing out an undercut in falling trees.

Other objects, and objects relating to structural details, may be ascertained from a study of the attached drawings and the following specification, wherein my invention is shown and described in its present preferred form, and as embodied in a bucking saw.

My invention comprises those novel parts and combinations thereof which are shown in the accompanying drawings, described in the specification, and particularly defined by the claims terminating the same.

Figure 3 is a plan view and Figure 4 a side elevation of the operative connecting means between the motor and saw.

Figure 5 is an end view of the saw tilted at an angle to avoid an obstacle, showing a means for supporting the device wholly from the log to be sawn.

Figure 6 is a transverse section through the supporting frame and the frame which supports the operating means, showing the releasable supporting connection therebetween.

Figure 7 is a plan view of a portion of this supporting means shown in Figure 6, taken on the line 7—7.

Figure 8 is an elevation of the device as it might be employed for undercutting.

Figure 9 is a top plan view and Figure 10 an elevation illustrating the device employed for sawing a tree.

Figure 11 is a detail elevation of the means for clamping the device at any angle relative to its support, especially when used for falling.

Figure 1:
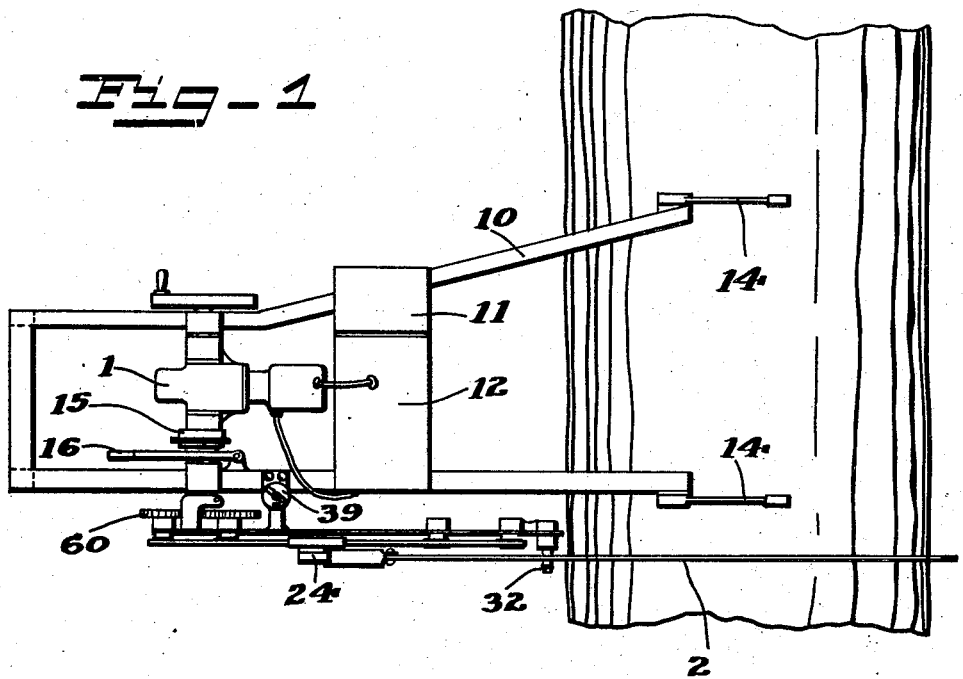
Figure 1 is a plan view and Figure 2 a side elevation of my saw employed in bucking a log.
Figure 2:
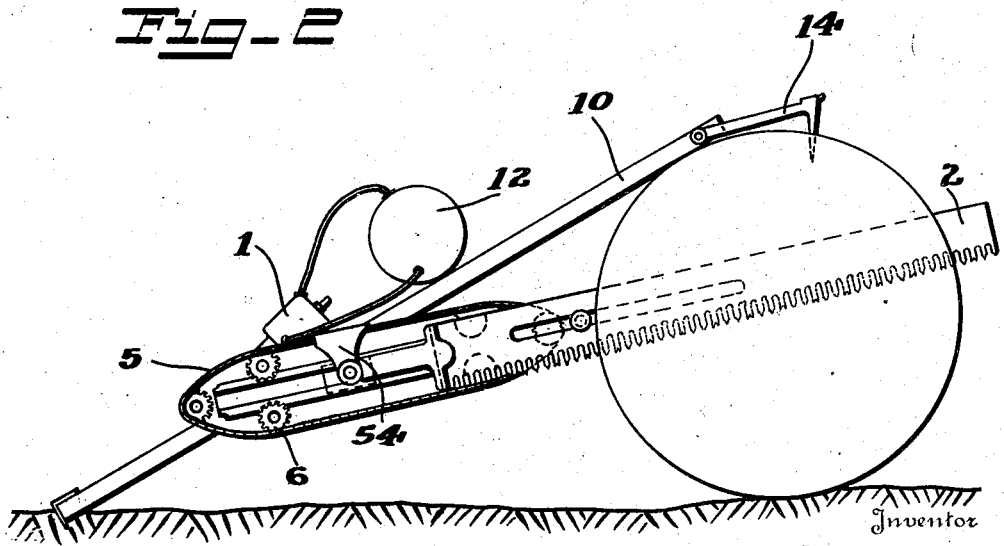

The principal parts of my invention comprise a support 10 upon which a motor 1 of any suitable type is supported, together with such tanks as the gasoline supply tank 11 and the water tank or radiator 12, a saw 2 of any suitable design, and means for communicating the rotary movement of the live shaft 13 into reciprocating movement of the saw 2.

The exact construction of the frame 10 is relatively unimportant. It should be light so that it is easily portable and should have means for securing it to a tree or log which is to be sawn. I have shown dogs 14 which may be driven into a log to support one end of the frame 10 thereon. This is suitable for a drag saw or bucking saw, but other means may be provided when the saw is used for falling. The opposite end of the frame in bucking is usually intended to rest upon the ground. The motor likewise is of any suitable design, and to enable it to function properly in various positions may employ an injector or a flexibly connected carburetor. As such expedients are well-known in the motor art, they require no detailed explanation here. It is only essential to state that in addition to being capable of use in various positions, the motor must be one which is sufficiently powerful and yet which may be transported without great difficulty. A clutch enclosed within the casing 15 and controlled by a handle 16 controls the application of power to the shaft 13.

A frame 3 is supported from the support 10 preferably in such manner that it is pivoted coaxially with the shaft 13. I have shown an arm secured to the frame 3 and terminating in a bearing 30, one half of which is shown. This bearing receives a sleeve 17 enclosing the shaft 13. The frame 3 carries a crosshead guide 31 within which is reciprocable a crosshead 4. Removably secured to the crosshead in some suitable manner, or to the pin 41 forming a part thereof, is an end of the saw 2. The outer end of the saw may be supported directly from the frame 3, and for this purpose I have shown an antifriction roller 32 supported in a projecting arm 33 carried by the frame 3. The roller 32 is intended to be received in a slot 23 in the saw 2. The saw 2 and frame 3 are thus held rigid except for relative reciprocating movement. The saw may be quickly removed from the frame, and the frame from the support 10, to transport the device.

The outer periphery of the frame 3, as indicated at 35, is formed as a guide for a chain 5. The chain preferably does not rest directly upon the peripheral guide 35 but is supported therefrom by means of laterally projecting guide rollers 51, two such rollers being shown as journaled in arms 50 which are secured to the chain. A link 54 is secured to the chain 5 at a point between the two arms 50 and connects the chain with the pivot pin 41 of the cross head 4. The link 54 and arms 50 are shown herein as formed in one piece. At the ends the chain guide 35 terminates in cams 36 formed somewhat as a cycloid. The purpose of this will be apparent hereafter.

Means are provided on the frame 3 for supporting and driving the chain 5. At the ends of the frame 3 I journal three sprockets 6, these being arranged in a triangle and serving to guide the chain 5 about the ends of the frame 3. Means are provided for driving at least one of these sets of sprockets 6, although it may be necessary at times to drive both sets of sprockets, as has been shown in Figure 3. This, however, is a matter of choice and is determined by the conditions under which the saw is to be operated. I have illustrated three gears 60 corresponding each to its respective sprocket 6 and journaled in the frame 3. A central gear 61 is in mesh with all three of the gears 60 and is operatively connected to the live shaft 13 upon which it is shown as secured. In cases where it is desired to drive the sprockets at both ends of the frame, a bevel gear 62 may also be secured upon the shaft 13, this meshing with a bevel gear 63 upon a longitudinal shaft 64, this shaft being connected through bevel gears 65 and 66 to the central gear 61 at the opposite end of the frame.

I have shown yieldable means connecting the saw 2 and the pin 41 of the crosshead 4. These means comprise a pin 24, a casing 25 fitting thereabout, and a spring 26 interposed between the pin 24 and casing 25, and yieldable in each direction. The casing 25 is removably connected to the saw 2, and the pin 24 to the crosshead. Obviously any other suitable means may be employed for this purpose.

Upon rotation of the shaft 13 the gear 61 is rotated and gears 60 and sprockets 6 are all rotated in the same direction. The chain 5 is thus set in motion, moving in a single direction about the frame 3 and guides 35 and 36. By reason of the connection of the cross head 4 to the chain the crosshead is reciprocated in its guide 31, and thus the saw 2 is reciprocated. As the cross head approaches an end of its stroke the link of the chain to which it is connected rides upon the guide 36. This cam guide is so formed that the speed of the crosshead is gradually decreased towards the end of its stroke and gradually increased at the beginning of its stroke. This is best illustrated by the dot-and-dash lines 7, 71, 72 and 73 in Figure 4, representing successive positions of a median line through link 54. By reason of this arrangement the stroke of the saw is not begun at maximum speeds and the saw is given an opportunity to begin cutting through the wood gradually, rather than being started with a jerk. In case, it encounters an obstruction the spring 26 will prevent injury to the saw or the drive mechanism therefor. The arms 50 in addition to guiding the chain, prevent twisting of the link 54 relative to its normal position at right angles to the general direction of the chain 5.

Preferably also I provide means whereby the frame 3 is supported from the support 10 to the end that the saw when it cuts through a log will not fall upon the ground but may be held therefrom. It is also convenient at this point to insert a feed-controlling device, this being especially useful in undercutting. I have shown a lug 37 secured upon the frame and adapted to receive a ring 38' forming the lower end of the screw 38. The screw 38 is removably secured to the frame 10 and for this purpose I have shown a split or bifurcated bracket 18 secured to the frame 10 and adapted to receive a nut 39 threaded upon the screw 38. By slightly raising the screw 38 and nut 39 and moving it to one side, it can be released from the bracket 18. For this purpose I have provided a handle 39' upon the screw.

At times it may be desirable to elevate the rear end of the frame 10 and to permit this I have illustrated the ground end or that end which is normally resting upon the ground as pivoted upon the remainder of the frame so that the portion 10' may be bent at an angle to the main frame 10 to form a supporting leg. Means are shown at 19 for clamping the two parts in relative adjusted position.

It may also be desirable at times to support the entire frame 10 from the log which is to be sawn, rather than from the log and the ground. Such a construction is shown in Figure 5. Herein the dogs 14 are provided with ratchet teeth 8 with which are engaged dogs 80 mounted on the frame 10. By driving in the dogs 14 and engaging the ratchet dogs 80 with the teeth 8 thereof, the dogs being held firmly in the log, will permit the support of the frame solely from the dogs and therefore from the log which is to be sawn. Such a support is adapted especially to use in positions wherein the stroke of the saw would normally be obstructed by a log or boulder on the far side of the log or where there is no suitable support for the ground end of the frame 10.

My device may also be employed for falling. Such use and the constructions enabling it are shown in Figures 9, 10 and 11. In this form the support frame 9 is provided with dogs 14' which secure it to the trunk of the tree which is to be felled. Adjusting screws 90 may be employed in connection with the frame 9 to provide a three or four-point bearing surface upon the tree. The frame 9 is provided with a pivot trunnion 91 upon which is pivoted as a whole the engine 1, the frame 3 and saw 2 connected thereto, and a table 92 which acts as a support for the frame 3 and saw 2. Some suitable means are provided for fixing the table 92 and the supporting frame 9 in relative angularly adjusted position. Such means have been illustrated in Figure 11 and comprise a pinion 93 secured upon the shaft 91, an arm 94 pivoted upon the table 92 or its support and engageable at one end with the pinion 9' by similarly shaped teeth. Its other end is controlled in position by a control lever 95 acting upon a cam surface 96 of the lever 94. The positions of this arm 94 are shown in full lines and in dotted lines respectively. Obviously any other suitable means may be employed for this purpose.

I have shown also a section 14" between the ends of the dogs 14' which is resilient to a slight degree, thus affording some give between the support 9 and the saw 2. The support 9 is secured in place upon the tree trunk and a horizontal cut A is made in a side of the tree. The table 92 and parts connected thereto are then swung upon the pivot 91 and a diagonal cut B is made to take out a wedge, thus forming the undercut. The device is then shifted to the opposite side of the tree and a horizontal kerf C is cut until the tree is felled.

What I claim as my invention is:

1. In combination, a motor, a reciprocable saw, a reciprocable crosshead and a guide therefor, said saw being connected to said crosshead, a chain operatively connected to said crosshead, and connected to be driven by said motor, and a guide for said chain terminating at each end in cams approaching a cycloid, whereby the speed of said crosshead and saw is gradually increased at the beginning of a stroke.

2. In a power saw-operating mechanism, in combination with a reciprocable crosshead and a motor for operating the same, an endless chain means, including sprockets and peripheral guides at the end of the chain run for supporting and guiding said chain, means for driving said chain from said motor, a crosshead guide extending from the guide sprocket at one end of the chains run towards the sprocket at the opposite end of its run and along the line connecting the axis of said sprockets, the said crosshead being reciprocable with said guide, a link secured in said chain and pivoting upon the crosshead, said link having lateral arms extending substantially parallel to a straight run of the chain and having guiding engagement with said peripheral guide.

3. In combination, a motor, a reciprocable saw, a frame, a crosshead guide carried by said frame, a second guide formed about the periphery of said frame, a crosshead connected to said saw and reciprocable in said crosshead guide, a chain guided by said peripheral guide, three sprocket wheels positioned in a triangle at each end of the frame to guide the chain thereabout, and means for driving said sprockets from the motor.

4. In combination, a motor, a reciprocable saw, means operatively connecting the motor and saw including a crosshead reciprocable from the motor, a pin carried by said crosshead, a telescoping arm pivoted by one end thereon, and secured at its other end to the saw, and a spring interposed between the relatively movable parts of the said arm.

5. In combination, a motor, a support therefor, a reciprocable saw, a frame pivotally supported coaxially of the motor shaft, a gear carried by the motor shaft, three gears journaled in an end of said frame and arranged in a triangle about and meshing with said first gear, three sprockets carried by the frame and corresponding to the three gears, and rotated thereby, a chain carried by said sprockets, means for guiding said chain about the opposite end of said frame, a crosshead and a guide therefor carried by the frame, said crosshead being connected to said saw, and means connecting the chain and crosshead to reciprocate the latter.

Signed at Seattle, King County, Washington, this 3rd day of October, 1922.

FREDRIK HALVORSEN.